United States Patent Office 3,373,190
Patented Mar. 12, 1968

3,373,190
DIHALOCYCLOPROPYL AROMATIC CARBOXYLIC ACID
Ivan C. Popoff, Ambler, and Bernard Loev, Broomall, Pa., assignors to Pennsalt Chemicals Corporation, Philadelphia, Pa., a corporation of Pennsylvania
No Drawing. Continuation-in-part of application Ser. No. 724,527, Mar. 28, 1958. This application Apr. 26, 1965, Ser. No. 451,032
4 Claims. (Cl. 260—515)

This application is a continuation-in-part application of Ser. No. 724,527, filed Mar. 28, 1958, now abandoned.

This invention relates to new compounds containing the dichlorocyclopropyl group

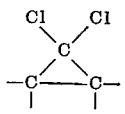

and certain derivatives of these compounds.

Saturated compounds containing the dichlorocyclopropyl group and the corresponding dibromocyclopropyl group:

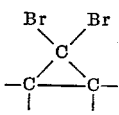

such as 1,2-dimethyl-3,3-dichlorocyclopropane

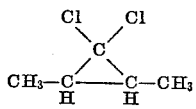

or 1,2-dimethyl-3,3-dibromocyclopropane

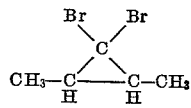

are known. Compounds of this type are characterized by unusual chemical inertness. Since they are saturated compounds, however, and contain no reactive substituents they have limited utility since it is difficult to convert them to desired derivatives.

A new series of compounds of excellent utility have now been found which contain the dichlorocyclopropyl group

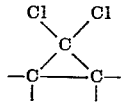

together with a neighboring carbon to carbon double bond.

Specifically the new compounds are aromatic carboxylic acids characterized by the presence of a

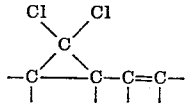

group wherein the

group is part of an aromatic ring. The carbons of the dichlorocyclopropyl group.

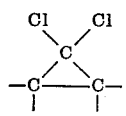

are other than those in an aromatic ring. The term "aromatic ring" as used herein includes carbocyclic rings of the benzene series, including for example benzene, naphthalene, anthracene, etc.

The class of dichlorocyclopropyl compounds within the scope of the invention are those in which the double bond neighboring to the dichlorocyclopropane group is a double bond in a carbocyclic aromatic ring (that is, part of a carbocyclic aromatic ring) such as in the following compounds:

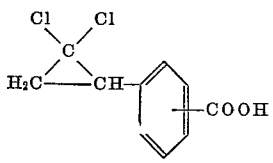

(particularly when the vinyl group is ortho or para to the dichlorocyclopropyl group).

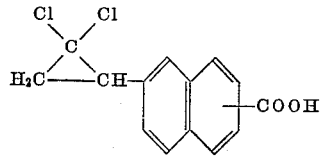

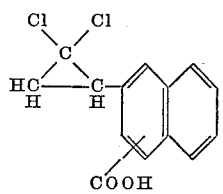

The new compounds of the invention may be prepared by reacting chloroform, $CHCl_3$, with compounds in which an olefinic double bond is conjugated with an aromatic double bond such as vinyl substituted aromatic compounds which have a ring substituted functional group capable of being converted to the acid. Thus, divinylbenzene, di-vinylnaphthalene, and the like with 1 mole of chloroform and subsequently oxidized to form the acid from the remaining vinyl substituent.

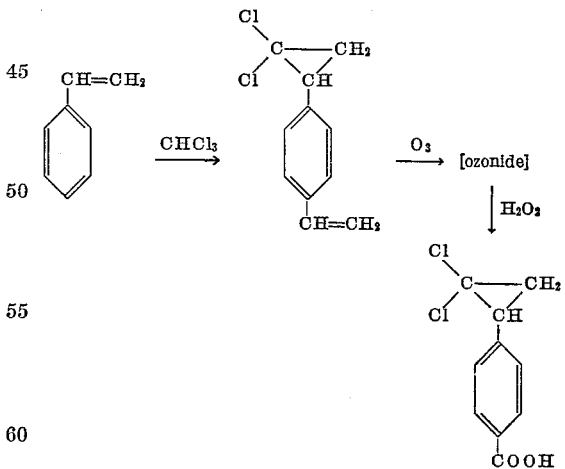

The reaction with $CHCl_3$ should be carried out in the presence of an alkali metal alkoxide such as potassium tertiary butoxide, sodium methoxide, or potassium tertiary-amylate. The preferred alkali metal alkoxide is potassium tertiary butoxide. For best results the reaction should be carried out under anhydrous conditions.

The solvent for the reaction may be an alcohol, and preferably an alcohol corresponding to the alkali metal alkoxide, particularly tertiary butyl alcohol. Under some circumstances, other inert solvents may be employed such as benzene, diethylether, dioxane, petroleum ether and the like.

The reaction is generally carried out over the temperature range of from $-50°$ C. to $+100°$ C. although lower temperatures can be used where required in the handling of low boiling compounds. The preferred temperature range is $-20°$ C. to $+40°$ C. The reaction may be carried out at sub-atmospheric, atmospheric or super-atmospheric pressures, although in most instances the reaction is readily carried out at atmospheric pressures, and atmospheric pressures are accordingly preferred.

Example 1

In a four necked flask equipped with a stirrer, thermometer well, dropping funnel, and Dry Ice condenser with a $CaCl_2$ drying tube, there is placed a solution of 650 grams (5 moles) of commercial grade divinylbenzene in 240 grams (2 moles) of $CHCl_3$. The divinylbenzene is a mixture having a narrow boiling range and containing the various divinylbenzene isomers (predominately ortho and meta with some para) as well as some ethyl vinylbenzene. The flask and contents are chilled and 250 grams (2 moles) of a suspension of potassium tertiary amylate in hexane is gradually added to the chilled solution. The reaction temperature is maintained at 15° C. by means of a cooling bath. After the addition is complete, the reaction is stirred another hour at 15° C. and overnight at 25° C. The salt (KCl) is filtered off, and the solution is then washed with water, dried and distilled in vacuo.

After removal of the unreacted divinylbenzene and ethyl vinylbenzene, a fraction is obtained consisting of the various isomers (predominately ortho and para) of (2,2-dichlorocyclopropyl)-vinylbenzene

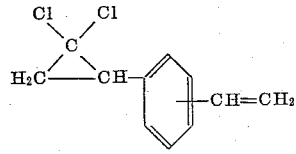

The oxidation to the acid may be readily carried out by use of standard oxidizing agents, such as potassium permanganate or potassium dichromate. A particularly advantageous method of oxidation involves the use of ozone to form an ozonide at the double bond. The ozonide, on treatment with hydrogen peroxide, gives the corresponding acid.

A solution of 15 grams of the (2,2-dichlorocyclopropyl) vinylbenzene is ethyl acetate is ozonized by passing a stream of ozone into the solution at a temperature of about 0° C. Care is taken not to use excess ozone to avoid attack of the aromatic ring. The ozonide solution is the refluxed with 35% hydrogen peroxide, and the solvent and water are removed by vacuum distillation, leaving a waxy solid, (2,2-dichlorocyclopropyl) benzoic acid,

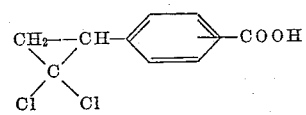

The compounds of the invention have utility as herbicides, insecticides, particularly as fumigants; bactericides, lubricants, plasticizers, lube oil additives and pharmaceuticals.

We claim:

1. A 1-(2,2-dihalocyclopropyl) aromatic carboxylic acid having the formula

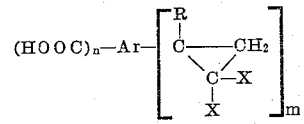

wherein Ar is an aromatic hydrocarbon group, $n$ is 1, $m$ is 1, and wherein R is hydrogen and X is chlorine.

2. A benzoic acid having the formula

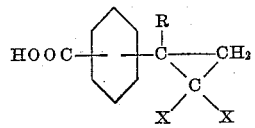

wherein R is hydrogen and X is chlorine.

3. p-(2,2-dichlorocyclopropyl) benzoic acid.
4. o-(2,2-dichlorocyproyl) benzoic acid.

References Cited

UNITED STATES PATENTS 3,157,697  11/1964  Sandri et al. _____ 260—515

LORRAINE A. WEINBERGER, *Primary Examiner.*

T. L. GALLOWAY, *Assistant Examiner.*

UNITED STATES PATENT OFFICE
CERTIFICATE OF CORRECTION

Patent No. 3,373,190                      March 12, 1968

Ivan C. Popoff et al.

It is hereby certified that error appears in the above numbered patent requiring correction and that the said Letters Patent should read as corrected below.

Column 2, lines 45 to 53, the left-hand portion of the equation should appear as shown below instead of as in the patent:

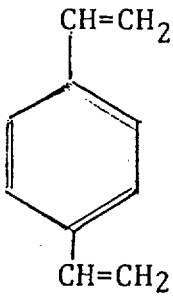

column 4, line 2, for "is", first occurrence, read -- in --; line 6, for "the", first occurrence, read -- then --; line 38, for "o-(2,2-dichlorocycloproyl" read -- o-2,2-dichlorocyclopropyl --.

Signed and sealed this 1st day of July 1969.

(SEAL)
Attest:

EDWARD M. FLETCHER, JR.
Attesting Officer

WILLIAM E. SCHUYLER, JR.
Commissioner of Patents